Oct. 6, 1925.
O. BRISBOIS
1,555,939
YIELDING FRICTION DRIVE
Filed Feb. 6, 1922
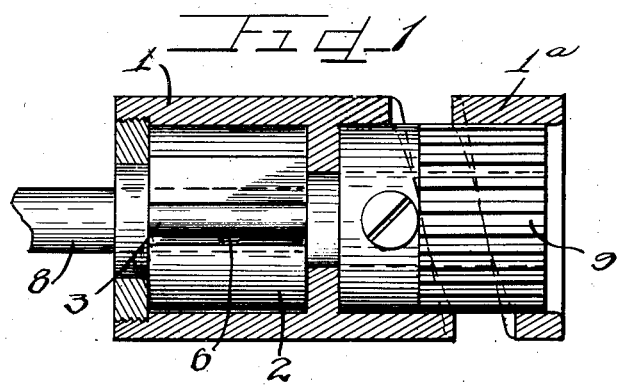
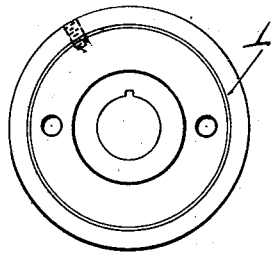
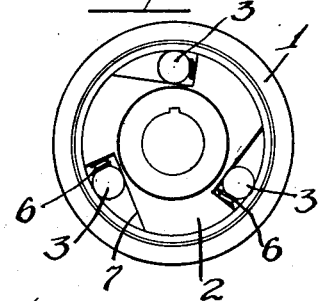
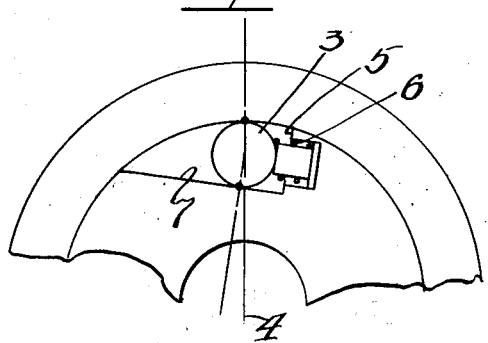
WITNESSES
J. W. Angell
Carleton D. Kee
INVENTOR
Odilon Brisbois
by Chas. L. Will
ATTY Patented Oct. 6, 1925.

1,555,939

UNITED STATES PATENT OFFICE.

ODILON BRISBOIS, OF CHICAGO, ILLINOIS.

YIELDING FRICTION DRIVE.

Application filed February 6, 1922. Serial No. 534,361.

*To all whom it may concern:*

Be it known that I, ODILON BRISBOIS, a citizen of the United States, and a resident of the city of Chicago, in the county of Cook and State of Illinois, have invented certain new and useful Improvements in Yielding Friction Drives; and I do hereby declare that the following is a full, clear, and exact description of the same, reference being had to the accompanying drawings, and to the numerals of reference marked thereon, which form a part of this specification.

This invention relates to a one-way friction clutch especially adapted for automobile starters and gearing transmissions.

In automobile starters, it has been found necessary to use a yielding drive between the motor and the driving or starting pinion to avoid the stripping of gears and to prevent injury to the parts upon back-fire. In the past, a coil spring has been used for the yielding drive, but this spring would break or become distorted beyond repair upon back-fire, and proved unsatisfactory. In general, the coil spring proved a clumsy and unpracticable drive, that automobile builders have sought to avoid.

To overcome the above enumerated objections, I have invented a one-way friction roller clutch designed to yield under a predetermined load to prevent stripping of the gears and injury to the parts in case of back-fire when the same is used in an engine starter.

My invention comprises the novel mechanism hereinafter described and more particularly pointed out in the appended claim.

In the accompanying drawings which illustrate a preferred embodiment of this invention and in which similar reference numerals refer to similar features in the different views:

Figure 1 is a central longitudinal section through a one-way clutch showing parts in elevation.

Figure 2 is an end view of the clutch with the enclosing washer or cap removed.

Figure 3 is an end view of the clutch with the enclosing washer in place.

Figure 4 is a fragmentary diagrammatic view upon an enlarged scale illustrating the principle of my invention.

In the drawings, I have illustrated a one-way friction roller clutch for explaining the principle of my invention but it should be understood that balls or other rolling elements may be used as the gripping means. The illustrated form of clutch comprises an outer cylindrical clutch member 1 which may be in the form of a drum or sleeve, and an inner clutch member 2 which has a cylindrical periphery, except where the roller recesses are formed, that is adapted for a relative revolvable fit in the outer clutch member. Rolling elements 3 fit in the recesses between the two clutch members and form frictional gripping elements that become operative during one direction of rotation of the inner clutch member but inoperative during the other direction of rotation thereof as is well known.

My invention concerns itself primarily with the structure of the roller recesses, one of which is diagrammatically illustrated in Figure 4 to which reference will later be made. Any number of such roller recesses may be used; in the present instance, three such recesses are illustrated as being the preferable construction, but as they are all similar, only one will be described. In referring now to said Figure 4, the numeral 4 represents a line through the diameters of the two clutch members and the diameter of the rolling element 3 in its operative gripping relation with the clutch members. The recess is provided with a vertical front wall 5 spaced some distance to the right of the line 4 to provide a non-gripping space into which the rolling element 3 is adapted to move out of gripping relation with the two clutch members when the inner member moves in a counter-clockwise direction. The front wall of said recess is provided with a socket in which a coil spring 6 is anchored at one end, the opposite end of which is adapted to yieldingly press against the gripping element to force it into gripping relation with the clutch members in order to secure an initial gripping action. The base or friction surface 7 of said recess is a plane surface that extends from the front wall 5 to the outer periphery of the inner clutch member upon such an angle that the said surface 7 is tangent to the rolling or gripping element at a point shown as about 10 degrees to the left of the diameter line 4 when said roller element 3 is in operative contacting relation with the clutch members as shown in Figure 4. This construction brings the rolling elements into contact with the clutch members upon converging tangents the chord of which subtends substantially an arc of 170 degrees between the tangents; that is, the shorter arc between the contacting points on the rollers is about 170°. Under a gradually steady and powerful load, the rollers will grip tightly so that there will be no yield. However, when a sudden reverse force such as arises from a back kick of an engine is applied, the rollers will turn or slip allowing a certain amount of yield. This yield will be sufficient to absorb the sudden impact arising from the back kick of the engine so that the parts will not be damaged.

The clutch member 2 is adapted to be connected with a driving shaft and the outer clutch member 1 is adapted to be connected to a driven member. In the illustrated application of the invention, a shaft 8 is splined to the clutch member 2 and loosely supports a gear 9 thereon which is provided with a radial stud operating in a spiral groove in the extension 1ª of the outer clutch member. Upon rotation of the shaft 8 in a clockwise direction, the member 1 will be gripped and caused to travel therewith, moving the gear 9 longitudinally into mesh with another gear which may be upon the fly wheel of an engine which it is intended to start.

In the application of this invention to an automobile starter, the sudden impact or force arising from a back-kick of the engine will temporarily disarrange the frictional contact of the rolling elements so that the clutch will yield a certain amount and prevent damage to the parts.

I am aware that numerous details of construction may be varied through a wide range without departing from the principles of this invention, and I therefore do not purpose limiting the patent granted otherwise than necessitated by the prior art.

I claim as my invention:

In a one-way clutch, an outer member, an inner member, a rolling element between said members and operatively contacting therewith upon points separated by an arc of substantially 170 degrees circumferentially of said rolling element.

In testimony whereof I have hereunto subscribed my name.

ODILON BRISBOIS.